UNITED STATES PATENT OFFICE.

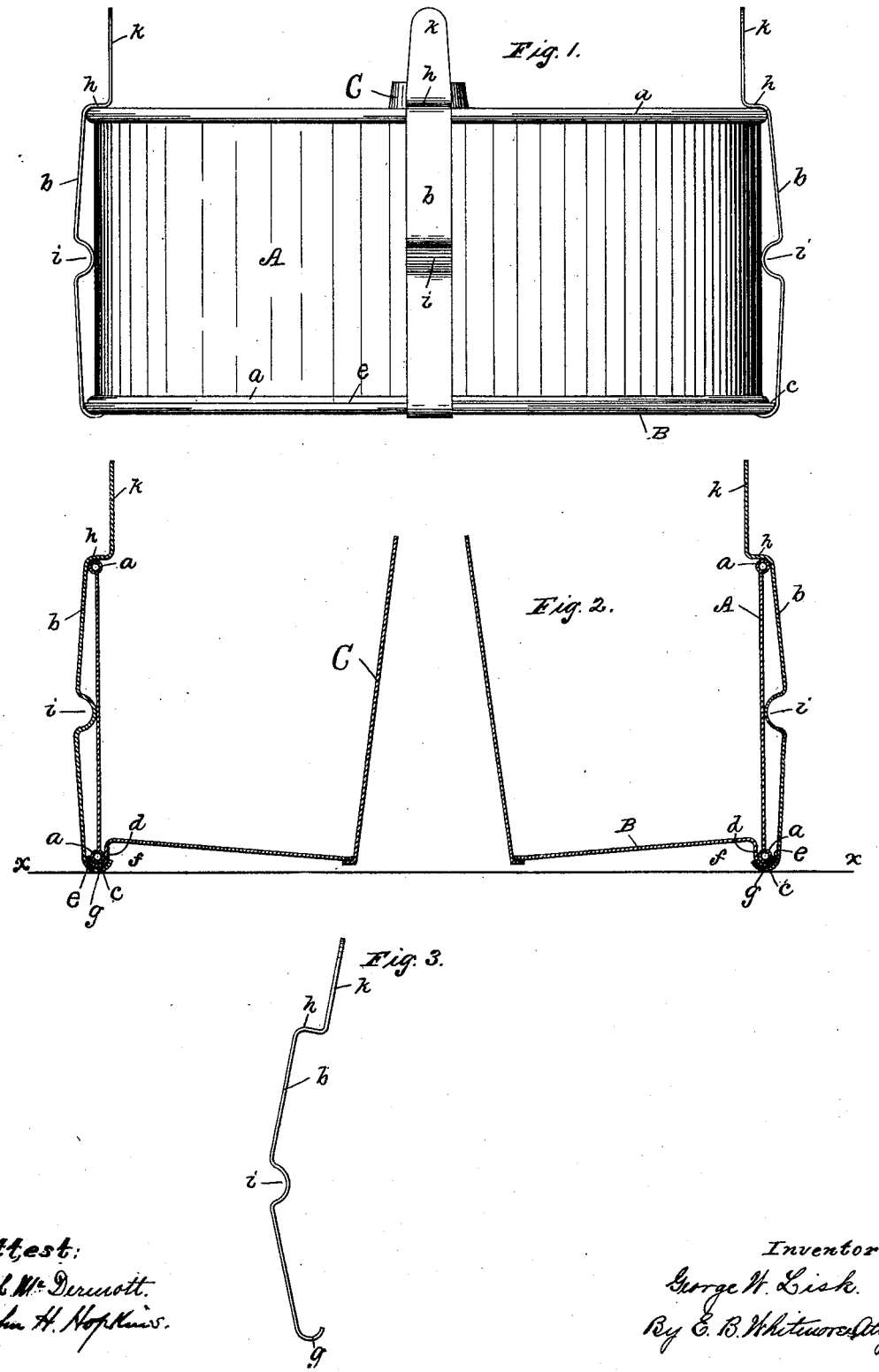

GEORGE W. LISK, OF CLIFTON SPRINGS, NEW YORK, ASSIGNOR OF ONE-HALF TO MURRY A. LISK, OF SAME PLACE.

BAKING-PAN.

SPECIFICATION forming part of Letters Patent No. 432,315, dated July 15, 1890.

Application filed April 11, 1890. Serial No. 347,476. (No model.)

*To all whom it may concern:*

Be it known that I, GEORGE W. LISK, of Clifton Springs, in the county of Ontario and State of New York, have invented a new and useful Improvement in Baking-Pans, which improvement is fully set forth in the following specification and shown in the accompanying drawings.

My invention is an improved baking-pan, the same being hereinafter fully described, and more particularly pointed out in the claims.

Referring to the drawings, Figure 1 is a side elevation of my improved baking-pan, showing all parts in place; Fig. 2, a central longitudinal section of the same, and Fig. 3 a view of one of the spring-fasteners in its normal shape.

Referring to the parts shown, A is the body of the pan, it being substantially a circular hoop of tin or other sheet metal formed at its upper and lower edges into beads or rolls *a a*, in the usual manner.

B is the bottom of the pan, which is preferably bent downward at the middle or made slightly dishing, as shown.

C is a central conical tube of common construction, which may or may not be added.

The bottom B is bent downward for some distance at its periphery, forming a depressed annular channel *c*, which constitutes a receptacle or rest for the edge of the body A, as shown in Fig. 2. In this construction of the bottom there is formed a deep inner shoulder *d* for the body A, which accurately centers the body upon the bottom B when these parts are put together. The extreme outer edge *e* of the bottom is not hooked or bent inward over the bead *a*, but is turned straight upward, preferably to the plane of the center of said bead, as shown, so that the band or body A may be easily lifted out of the channel *c* and removed entirely from the bottom B. The downward bend at *d* of the bottom B is purposely made a considerable distance, not only to form a centering-shoulder for the body, as stated, but also for the purpose of making the space *f* beneath the bottom of sufficient depth. By this means I am enabled to bend the bottom sufficiently downward at the middle without having it touch the floor *x x* of the oven at that point.

To hold the body A and bottom B together, I employ spring-fasteners *b*, as shown. These fasteners are preferably formed with bent lower ends *g*, to hook under the channeled portion of the bottom, and with offset bends *h*, to pass over the upper edge of the body. These fasteners, which are preferably strips of metal, are also formed with inward bends *i* at the middle of each, extending inward to touch the surface of the body. These inward or contact bends serve to steady the fasteners in their places. The fasteners, which are removable or detachable, are also preferably made with extensions *k*, to facilitate their removal from the pan, and also to form feet or rests upon which to support the pan in an inverted position.

It is sometimes convenient, after a cake is baked and while it is cooling, to invert the pan before the cake is removed, so that gravity shall act upon the cake to prevent its falling in at the middle of the cake.

The spring-fasteners in their normal condition are more bent, as shown in Fig. 3, than when sprung upon the sides of the pan. This change in form when forced upon the pan causes them, on account of their elasticity, to hold firmly to place and rigidly secure the bottom of the pan to the body.

What I claim as my invention is—

1. A baking-pan consisting of a rigid hoop or body, a separate bottom plate formed with a peripheral semicircular channel opening upward to receive the edge of the hoop or body, and separate or removable fasteners for said bottom plate and the hoop or body, substantially as shown.

2. A baking-pan consisting of a hoop or body and a separate bottom plate formed with a peripheral channel to receive the edge of the body, in combination with separate detachable fasteners for the body and bottom plate, formed with bends *i* at their middle parts to rest against the body, substantially as shown.

3. A baking-pan consisting of a hoop or body and a removable bottom, the latter being formed with a peripheral rest for the body and a bend or shoulder $d$, forming space $f$ beneath the pan, said bottom being dished or bent downward at the middle, as shown, in combination with removable fasteners for said body and bottom part.

In witness whereof I have hereunto set my hand, this 17th day of March, 1890, in the presence of two subscribing witnesses.

GEORGE W. LISK.

Witnesses:
E. B. WHITMORE,
M. L. MCDERMOTT.